United States Patent [19]

Tillery

[11] 4,023,850
[45] May 17, 1977

[54] TAILGATE EXTENSION

[76] Inventor: James M. Tillery, 1621 Broad St., Selma, Ala. 36701

[22] Filed: Apr. 2, 1975

[21] Appl. No.: 564,323

[52] U.S. Cl. .................................. 296/26; 108/44; 224/42.43; 296/58
[51] Int. Cl.² ........................................ B62D 33/02
[58] Field of Search ......... 296/26, 50, 57 R, 58–61; 224/42.32, 42.42 R, 42.43, 42.44, 42.03 R, 42.06, 42.07, 29 R; 108/44, 65, 90; 214/450

[56] References Cited

UNITED STATES PATENTS

| | | | |
|---|---|---|---|
| 634,951 | 10/1899 | Monroe | 296/59 |
| 749,187 | 1/1904 | Hanlow | 296/58 |
| 930,410 | 8/1909 | Noonan | 224/42.44 |
| 1,058,266 | 4/1913 | Saltzman | 296/58 |
| 1,475,732 | 11/1923 | Woods | 296/58 |
| 1,667,438 | 4/1928 | Sands | 296/58 |
| 2,214,575 | 9/1940 | Cercownay | 296/26 |
| 2,437,614 | 3/1948 | Richey | 296/60 |
| 2,727,781 | 12/1955 | D'Eath | 296/61 |
| 2,777,625 | 1/1957 | Kronhaus | 224/42.43 |
| 3,578,749 | 5/1971 | Woten | 296/57 R |

Primary Examiner—Robert J. Spar
Assistant Examiner—Winston H. Douglas
Attorney, Agent, or Firm—Clarence A. O'Brien; Harvey B. Jacobson

[57] ABSTRACT

A horizontal extension panel is provided for disposition immediately outwardly of the free end of the open tailgate of a pickup truck with the extension panel structure substantially coextensive with the tailgate and the opposing marginal edges of the extension panel structure and tailgate disposed in abutted relation. A pair of support arms extend across the upper surface of the extension panel structure along the opposite side marginal edges thereof and the support arms extend over the opposite side marginal edges of the tailgate and include terminal ends which overlap the opposite side marginal portions of the rear end of the floor of the pickup truck. A pair of rearwardly and downwardly inclined brace arms or members are secured at their rear lower ends to the outer portions of the support arms secured to the extension panel structure and the upper forward ends of the brace arms are secured to the upper rear marginal edge portions of the side walls of the pickup truck. In addition, upstanding braces are secured at their upper ends to the upper ends of the brace arms and at their lower ends to those portions of the support arms disposed immediately therebelow and overlying the opposite side marginal portions of the tailgate. Finally, the forward end portions of the support arms include downwardly directed flanges which are telescoped downwardly into the slot defined between the rear end edge of the flooring of the pickup truck load bed and the adjacent marginal edge of the tailgate.

5 Claims, 5 Drawing Figures

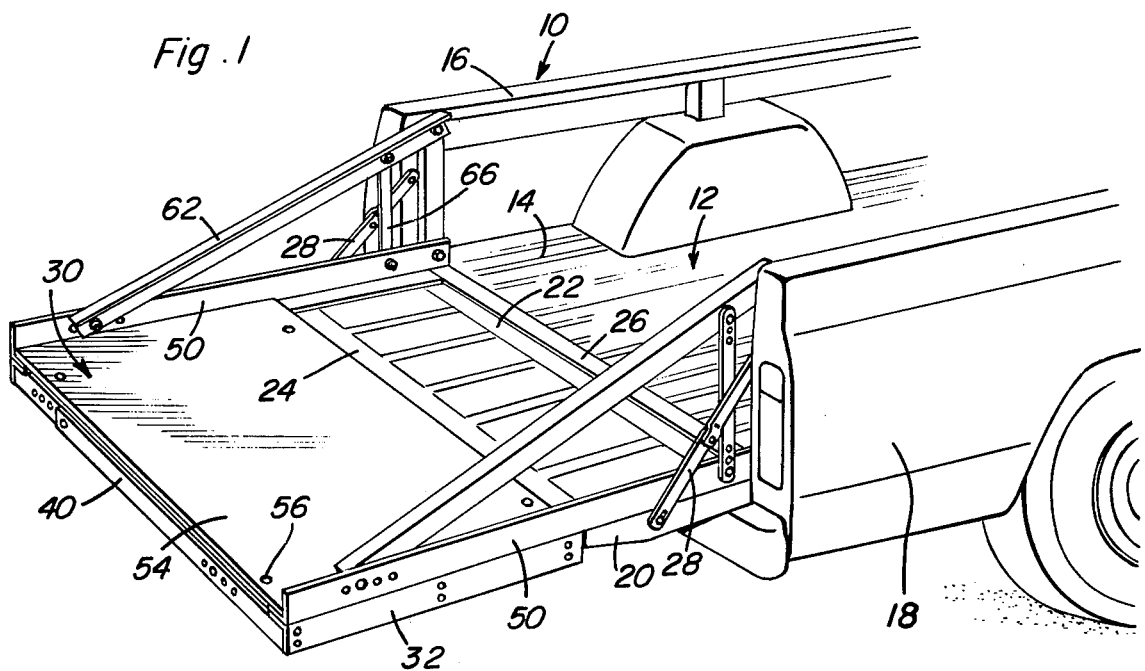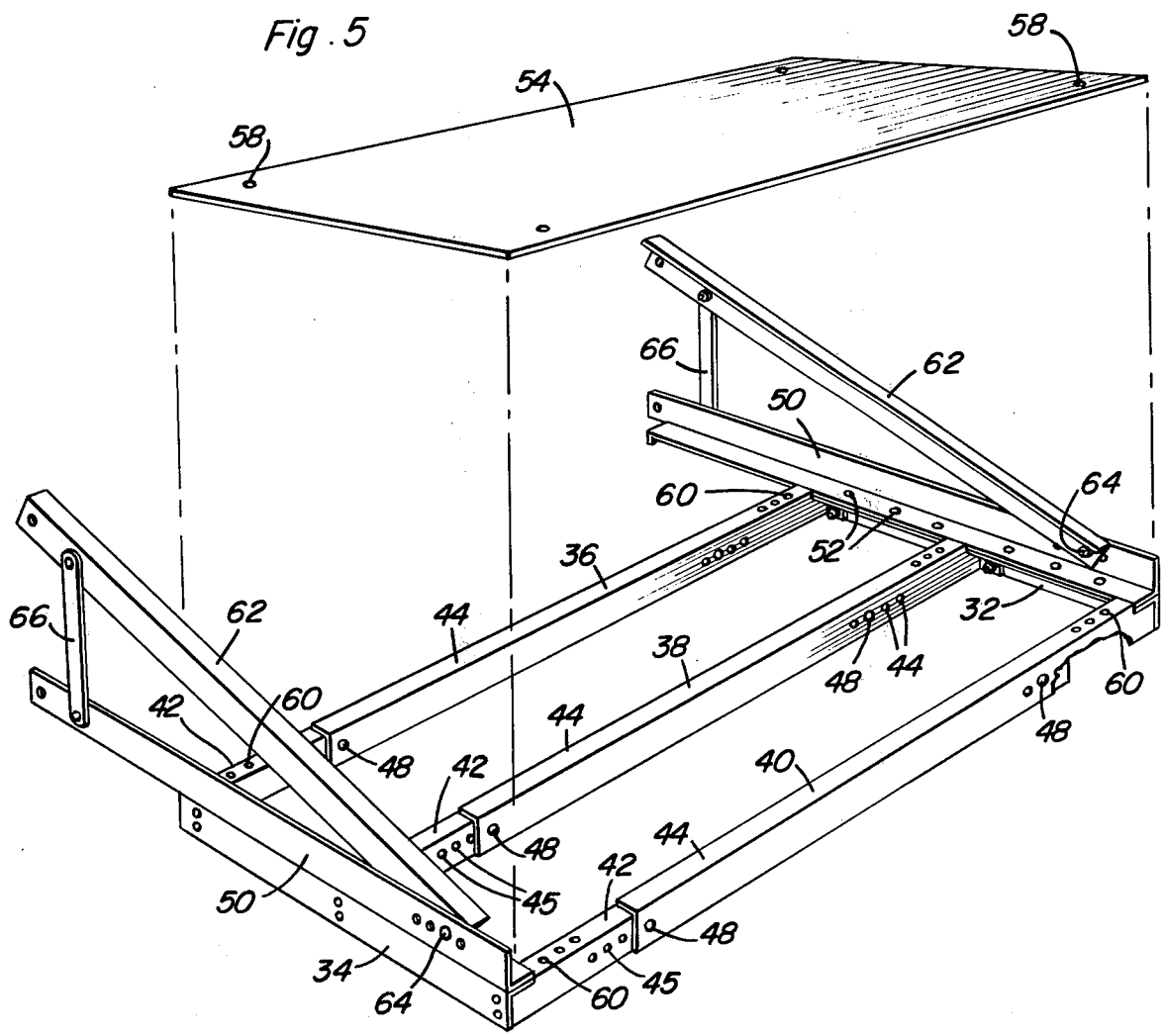

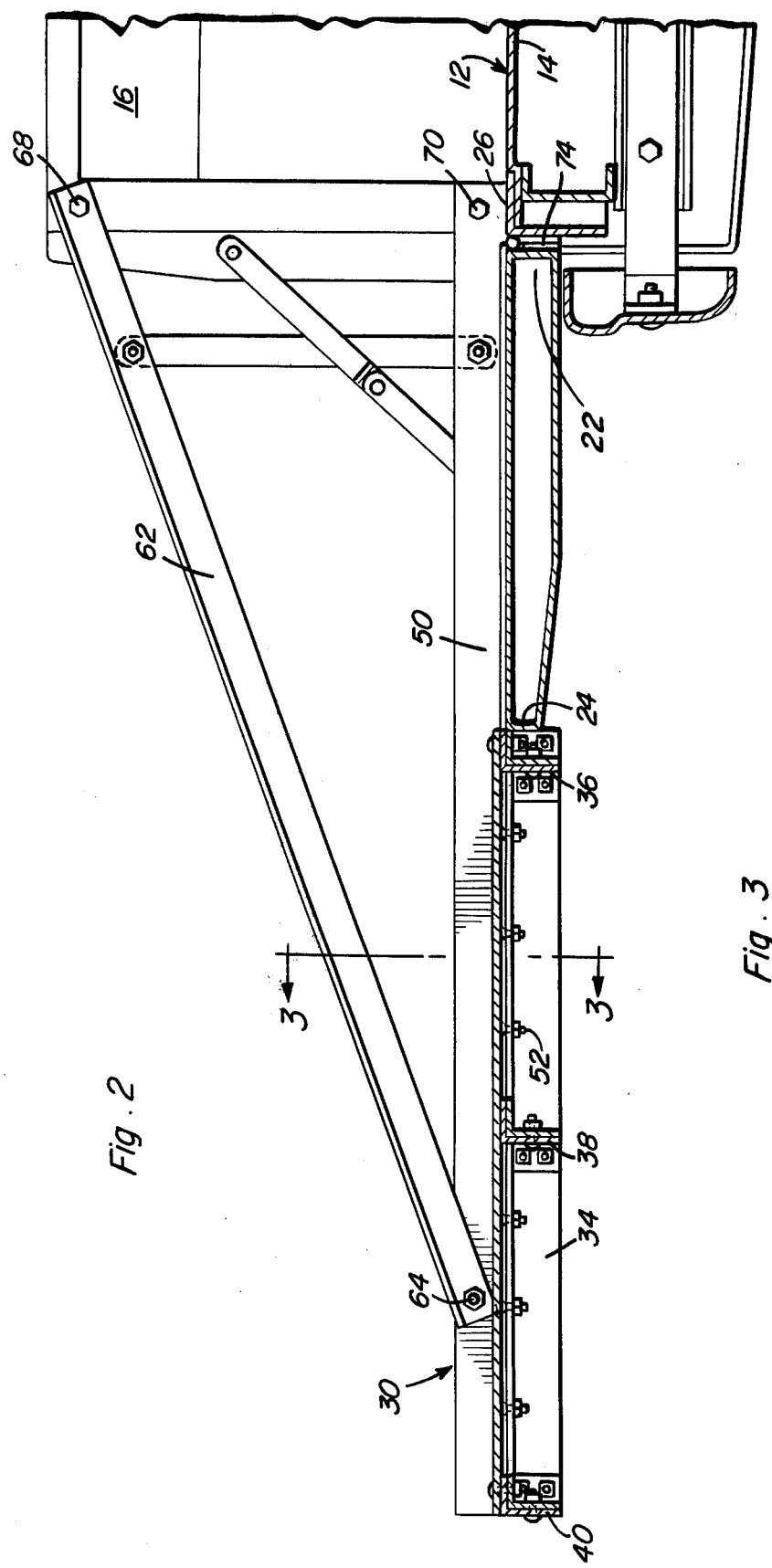
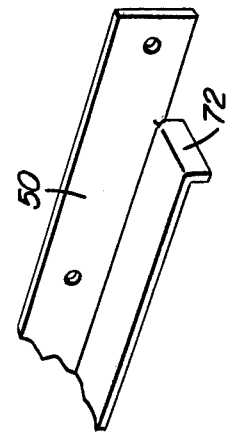
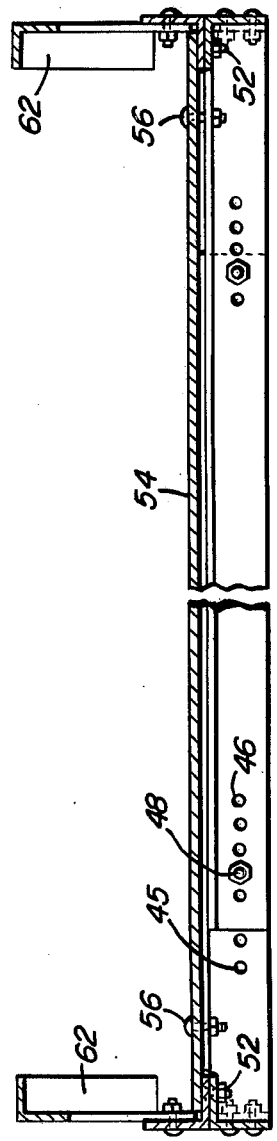

TAILGATE EXTENSION

BACKGROUND OF THE INVENTION

Although pickup trucks are constructed in generally two sizes so as to be provided with either 6½ foot load beds or 8 foot load beds, there are many instances when the owner of a pickup truck wishes to carry a long load in the load bed of his truck and many times such a long load projects considerably rearwardly of the free edge of the tailgate when the tailgate is in the lowered rearwardly projecting position.

Such long loads present a problem if they project considerably beyond the rear marginal edge of the tailgate inasmuch as the rear portion of the long load tends to fall downward toward the ground when at least a major portion of the length of the load is not disposed forward of the rear marginal edge of the tailgate.

The extension of the instant invention may be constructed of various sizes but in most cases an extension of 30 inches is sufficient to enable considerably longer loads to be carried on a pickup truck. Actually, an extension of 30 inches enables approximately a 5 foot longer load to be carried by the pickup truck.

SUMMARY OF THE INVENTION

The tailgate extension of the instant invention has been constructed in a manner whereby it may be readily adjusted for attachment to pickup truck load beds of different widths. Further, the extension is constructed in a manner whereby its attachment to an associated pickup truck will require only slight modifications to the pickup truck.

The main object of this invention is to provide a horizontal rearward extension of the lowered tailgate of a pickup truck to thereby enable that pickup truck to carry substantially longer loads in the load bed thereof.

Another object of this invention is to provide a tailgate extension in accordance with the preceding objects and constructed in a manner whereby it may be readily adjusted so as to be adaptable to pickup truck load beds of varying widths.

Another important object of this invention is to provide a tailgate extension which may be readily mounted upon and removed from an associated pickup truck with little effort and through the utilization of only simple hand tools.

An important object of this invention is to provide a pickup truck tailgate extension which may be mounted on an associated pickup truck with only slight modifications of the pickup truck being required.

A final object of this invention to be specifically enumerated herein is to provide a tailgate extension in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the rear portion of a conventional pickup truck load bed with the tailgate extension of the instant invention in operative association with the tailgate, side walls and flooring of the load bed;

FIG. 2 is a longitudinal vertical sectional view taken substantially upon a plane passing through the transverse center of the assemblage illustrated in FIG. 1;

FIG. 3 is a fragmentary transverse vertical sectional view taken substantially upon the plane indicated by the section line 3—3 of FIG. 2;

FIG. 4 is a fragmentary perspective view of the forward end portion of one of the support arms of the tailgate extension; and FIG. 5 is a perspective view of the tailgate extension with the upper cover panel thereof illustrated in exploded position and portions of the framework of the tailgate extension being broken away.

DETAILED DESCRIPTION OF THE INVENTION

Referring now more specifically to the drawings the numeral 10 generally designates a conventional form of pickup truck including a rear load bed referred to in general by the reference mumeral 12 and including a floor 14 and upstanding opposite side walls 16 and 18 between which the floor 14 extends. In addition, the load bed 12 includes a tailgate 20 of conventional design including inner and outer marginal edges 22 and 24 and with the inner marginal edge 22 pivotally supported from the rear marginal edge 26 of the floor 14 for oscillation of the tailgate 20 between the horizontally rearwardly directed position thereof illustrated in FIG. 1 and an upstanding position extending between the rear upstanding edge portions of the side walls 16 and 18, an articulated brace assembly 28 of conventional design being secured between each side edge of the tailgate 20 and the corresponding side wall of the load bed 12.

The above description comprises a description of a conventional form of pickup truck.

The extension of the instant invention comprises a generally horizontal extension panel assembly referred to in general by the reference numeral 30 and including a pair of opposite side front-to-rear extending angle memebers 32 and 34 interconnected by means of front, intermediate and rear transverse braces 36, 38 and 40 extending and secured therebetween. The brace 36 extends between the front ends of the angle members 32 and 34, the rear transverse brace 40 extends between the rear ends of the angle members 32 and 34 and the intermediate transverse brace 38 extends between the longitudinal mid-portions of the angle members 32 and 34. Each of the transverse braces includes a small dimensioned angle member 42 secured to the angle member 34 and projecting toward the angle member 32 and also a large dimensioned angle member 44 secured to the angle member 32 and projecting toward the angle member 34. The ends of the angle members 42 and 44 remote from the angle members 34 and 32 are overlapped and provided with selectively registrable bores 45 and 46 at opposite ends thereof through which fasteners 48 are secured. Thus, the effective spacing between the angle members 32 and 34 may be adjusted. In addition, each side of the panel assembly 30 includes a pair of angle members 50 which are secured to and extend along the upper flanges of the angle members 32 and 34, fasteners 52 being utilized to secure the horizontal flange portions of the angle members 50 to the horizontal flange portions of the angle members 32 and 34. The forward ends of the support arm defining angle members 50 project considerably forwardly of the opposite ends of the forward transverse brace member 36 and a panel 54 is secured at its four corners to the opposite ends of the transverse braces 36 and 40 by means of suitable fasteners 56 removably secured through corner apertures 58 in the panel 54 and apertures 60 formed in the corresponding ends of the angle members 42 and 44.

Of course, if the width of the frame defined by the angle members 32 and 34 and the transverse braces 36, 38 and 40 is varied, a panel 54 of different width will be utilized.

A pair of forwardly and upwardly inclined angle member braces 62 have their rear lower ends secured as by fasteners 64 to the rear end portions of the upstanding flanges of the angle members 50 and the upper forward end portions of the braces 62 are braced relative to the forward ends of the support arms defined by the angle members 50 by means of vertical braces 66 secured between the upper ends of the braces 62 and the forward end portions of the angle members 50. In operation, the panel assembly 30 is disposed immediately to the rear of the open tailgate 20 in the manner illustrated in FIGS. 1 and 2 of the drawings and the upper forward terminal ends of the braces 62 are secured to the upper ends of the rear upstanding edges of the side walls 16 and 18 by means of removable fasteners 68. The forward terminal ends of the support arms defined by the angle members 50 are secured to the lower ends of the upstanding rear marginal edges of the side walls 16 and 18 by means of removable fasteners 70 and the forward ends of the horizontal flanges of the angle members 50 are shortened and downwardly deflected as at 72 to define depending flanges which are downwardly telescoped into the opposite ends of the slot 74 defined between the rear marginal edge 26 of the flooring 14 and the inner marginal edge 22 of the tailgate 20. Further, the forward ends of the vertical flanges of the angle members 32 and 34 abut against the outer marginal edge 24 of the tailgate 20 at the opposite sides thereof. In this manner, the panel assembly 30 is securely supported from the load bed 12 and may support considerable weight thereon. Of course, the fasteners 68 and 70 may be readily removed with minimum of effort and through the utilization of simple hand tools and therefore the panel assembly 30 may be quickly remvoed from the pickup truck 10 and stored whenever the panel assembly or extension 30 has served its purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle load bed of the type including a floor having a rear marginal edge portion extending between corresponding rear ends of upstanding side walls of said load bed between which said floor extends and having a horizontal tailgate pivotally supported therefrom, extending along and projecting outwardly from said floor rear marginal edge portion substantially coextensive with said floor and including generally parallel pivoted inner and free swinging outer marginal edges with said inner marginal edge closely spaced from and generally paralleling said floor rear marginal edge portion, an elongated extension panel structure disposed outwardly of said tailgate outer free swinging marginal edge substantially coextensive with said tailgate, said panel structure including opposite inner and outer marginal edges and opposite longitudinal side edges, said inner marginal edge of said panel extending along and including portions thereof abutted against said outer free swinging marginal edge of said tailgate, a pair of longitudinal support arms supported from said extension panel structure and extending laterally outwardly from opposite ends of said inner marginal edge of said panel structure and fully across said tailgate between the free swinging and pivoted marginal edges thereof and overlying said tailgate in contact therewith, inclined bracing arms anchored at their lower ends to rear ends of said side edges of said panel structure and releasably secured at their upper ends to upper portions of the rear ends of said side walls spaced above said floor, and an upstanding rigid brace extending and connected between the upper end of each bracing arm and that portion of the corresponding support arm overlying the pivoted edge of said tailgate, the adjacent marginal edges of said floor and tailgate defining a slot therebetween, the ends of said support arms remote from said panel structure including depending abutments received downwadly in said slot and horizontally abutted against the rear marginal edge portion of said floor.

2. The combination of claim 1 wherein said support arms include free terminal ends at least partially overlying the opposite end portions of said rear marginal edge portion of said floor.

3. The combination of claim 2 including means releasably connecting the free ends of said support arms to lower portions of the adjacent ends of the corresponding side walls of said load bed.

4. The combination of claim 1 wherein said extension panel structure includes a generally rectangular frame having a pair of front-to-rear extending opposite side members interconnected by means of a plurality of transverse braces extending and secured therebetween.

5. The combination of claim 4 wherein said transverse braces include means operative to adjust the effective lengths thereof and thereby vary the spacing between said opposite side members.

* * * * *